United States Patent
Duong

(10) Patent No.: US 9,534,509 B2
(45) Date of Patent: Jan. 3, 2017

(54) COGENERATION DEVICE INCLUDING HYDROCONDENSER

(75) Inventor: Frédéric Duong, F-Pezilla-la-Riviere (FR)

(73) Assignee: SUEZ ENVIRONNEMENT, Paris la Defense (FR)

( * ) Notice: Subject to any disclaimer, the term of this patent is extended or adjusted under 35 U.S.C. 154(b) by 118 days.

(21) Appl. No.: 13/063,055

(22) PCT Filed: Sep. 8, 2009

(86) PCT No.: PCT/IB2009/053905
§ 371 (c)(1),
(2), (4) Date: May 5, 2011

(87) PCT Pub. No.: WO2010/029494
PCT Pub. Date: Mar. 18, 2010

(65) Prior Publication Data
US 2011/0203279 A1 Aug. 25, 2011

(30) Foreign Application Priority Data

Sep. 10, 2008 (FR) ..................... 08 04969

(51) Int. Cl.
*F01K 9/00* (2006.01)
*F28B 1/02* (2006.01)
(Continued)

(52) U.S. Cl.
CPC . *F01K 9/00* (2013.01); *F28B 1/02* (2013.01); *F28B 1/06* (2013.01); *F28B 7/00* (2013.01); *Y02E 20/14* (2013.01); *Y02P 80/15* (2015.11)

(58) Field of Classification Search
CPC .............. F01K 9/00; Y10S 165/911
(Continued)

(56) References Cited

U.S. PATENT DOCUMENTS 3,820,334 A    6/1974 Heller et al.
3,830,063 A *  8/1974 Morgan ................... 60/645
(Continued)

FOREIGN PATENT DOCUMENTS

BE    1006285    7/1994
DE    19745272   4/1999
(Continued)

OTHER PUBLICATIONS

Forgo, L., "Moeglichikeiten Der Steigerung Der Elektrischen Liestungsfaehigkeit von Heizkraftwerken Waehrend Warmer Jahreszeiten", Energietechnik, Leipzig, DE, vol. 21, No. 11, Nov. 1, 1971, pp. 510-513.

*Primary Examiner* — Kenneth Bomberg
*Assistant Examiner* — Paul Thiede
(74) *Attorney, Agent, or Firm* — Young & Thompson

(57) ABSTRACT

Device for improving the production of heat by cogeneration comprising a hot source producing steam which is expanded in a turbine the exhaust of which is connected to an air condenser (4) which removes heat, and comprising at least one second auxiliary condenser (5) in the form of a water condenser, the cooling liquid of this water condenser (5) being directed to a plant or equipment (B) in which its heat is extracted and used, then the liquid is returned to the water condenser; the water condenser (5) is incorporated into the air condenser (4).

7 Claims, 1 Drawing Sheet

(51) Int. Cl.
*F28B 1/06* (2006.01)
*F28B 7/00* (2006.01)

(58) Field of Classification Search
USPC .... 60/670, 688, 692, 693, 694, 39.182, 645; 62/476
See application file for complete search history.

(56) References Cited

U.S. PATENT DOCUMENTS

| | | | | |
|---|---|---|---|---|
| 4,078,399 | A | * | 3/1978 | Sugimoto et al. ............... 62/476 |
| 5,632,143 | A | * | 5/1997 | Fisher et al. ................ 60/39.182 |
| 6,233,941 | B1 | * | 5/2001 | Youssef .......................... 60/670 |
| 2004/0216460 | A1 | * | 11/2004 | Ruggieri ................ F01K 17/02 60/670 |
| 2008/0010968 | A1 | | 1/2008 | Hartmann et al. |

FOREIGN PATENT DOCUMENTS

| | | |
|---|---|---|
| WO | WO-2005119014 A | 12/2005 |
| WO | WO-2008002635 | 1/2008 |

* cited by examiner

COGENERATION DEVICE INCLUDING HYDROCONDENSER

CROSS REFERENCE TO RELATED APPLICATIONS

This application is a National Phase filing under 35 U.S.C. §371 of PCT/IB2009/053905 filed on Sep. 8, 2009; and this application claims priority to Application No. 0804969 filed in France on Sep. 10, 2008 under 35 U.S.C. §119; the entire contents of all are hereby incorporated by reference.

BACKGROUND

The present invention relates to a device for producing heat by cogeneration comprising a heat source, a steam turbine and a condenser situated at the exhaust of the turbine.

Cogeneration consists in simultaneously producing electricity and heat from a steam turbine, a gas turbine or a heat engine.

On a steam turbine, the heat can be extracted in the form of steam, taken by steam outlet between two rows of fins of the rotor at a pressure which makes it possible to power a steam-water heat exchanger. The position of the steam outlet on the body of a turbine makes it possible to take a certain quantity of steam at a variable pressure level depending on the use of the steam. The heat produced by the steam-water exchanger is then used directly or indirectly to heat premises or for various industrial applications.

The steam taken at a turbine steam outlet reduces the production of electricity over the fraction of steam that does not leave via the exhaust of the turbine at close to vacuum pressure. The loss of electrical production depends on the flow rate and outlet pressure.

At the outlet of the turbine, the steam condenser is used to transform the steam from the gaseous phase to liquid phase (condensate), and allows for looping of the closed energy-transformation cycle by returning the condensates to the heat source.

The steam condensers are heat exchangers used to condense the steam, in the form of $H_2O$ gas, into liquid water. It will be recalled that, during the condensation of the steam, the latent heat of transformation of the gaseous phase to liquid phase releases a significant energy, called the latent heat of condensation. This condensation phenomenon is reversible, and the counterpart is the evaporation of the water. The steam/water condensers are heat exchangers widely used in the field of static or dynamic heating.

In thermodynamic applications, the condensers constitute the "cold" source of the closed cycle. Several types of condensers can be distinguished.

The air condenser is a condenser which uses as coolant the ambient air or a gas. The air passes through exchange bodies comprising fins and the flow of air is mechanical. Air condensers operate within a pressure range that is very slightly positive and often negative relative to atmospheric pressure.

The hydrocondenser is a condenser which uses as coolant water or a liquid solution. These appliances are used in thermal power plants, their high heat exchange capacity making it possible to improve the performance levels of the thermodynamic cycle. The water passes through an exchanger with tubular surface or with plates.

The condenser is engineered and configured to allow for the condensation of all the steam obtained from the turbine or from the desuperheated expansion of the steam produced by a steam generator. The coolant of the condenser takes away, in the form of heat, a significant quantity of energy which is dissipated into the natural environment (air or water) and consequently lost. In general, the energy dissipated by the condenser represents approximately 50% of the primary energy consumed.

WO 2005/119014 relates to an installation for jointly producing electrical energy and heat, for example for heating greenhouses. The steam leaving the low-pressure stage of a turbine is partly directed to an air condenser, and the rest is directed to a hydrocondenser. The arrangement of the various units has to be improved as much for the recovery of energy as for space occupancy.

SUMMARY OF THE INVENTION

The primary aim of the invention is to make best use of all or part of the unexploited heat, taken away by the coolant of the condenser, in order to substantially improve the overall energy efficiency, in a reduced space.

According to the invention, a device for improving the production of heat by cogeneration comprising a heat source producing steam which is expanded in a turbine, the exhaust of which is linked to an air condenser which evacuates the heat, and comprising at least one second auxiliary condenser in the form of a hydrocondenser, the coolant of this hydrocondenser being directed toward an installation or equipment in which its heat is extracted and used, then the liquid is returned to the hydrocondenser, is characterized in that the hydrocondenser is incorporated in the air condenser.

The heat lost by the first condenser is thus reduced, since all or part of the steam is condensed in the second condenser which makes it possible to recover heat, and do so without in any way reducing the production of electricity as would be the case with a steam outlet situated upstream of the exhaust of the turbine. The incorporation of the hydrocondenser in the air condenser improves the recovery of energy in a reduced space.

Advantageously, the hydrocondenser is incorporated in the steam distribution chamber of the air condenser.

The hydrocondenser may be mounted in series or in parallel with the air condenser.

The link duct situated between the exhaust of the turbine and of the first condenser may be equipped with an integrated condensation system on the duct forming the second auxiliary condenser.

BRIEF DESCRIPTION OF THE DRAWINGS

Other features and advantages of the invention will become apparent from the following description of exemplary embodiments with reference to the appended drawings but which are in no way limiting. In these drawings.

DETAILED DESCRIPTION OF THE PREFERRED EMBODIMENT

A boiler 1, constituting a heat source SC, is used to add heat to the cycle. The water present in the circuit is vaporized as it passes into the boiler 1.

The outlet of the boiler 1 is linked to the inlet of a turbine 2 in which the water expands. The turbine 2 is coupled to an alternator 3 used to produce electricity.

Figure 1:
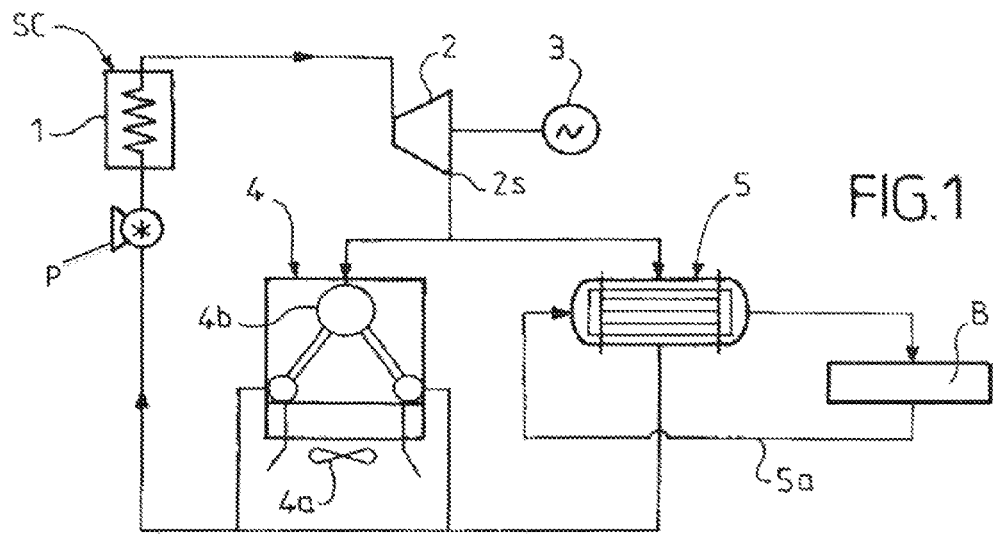
FIG. 1 is a diagram of the operating cycle of a device for producing energy by cogeneration according to the invention.

At the outlet 2s of the turbine 3, according to the invention, a first condenser 4 and a second condenser 5, namely a hydrocondenser, said condensers being separate, are positioned, in parallel according to FIG. 1, to condense the steam at the exhaust of the turbine 2.

The first condenser 4, in the example illustrated, is an air condenser. A stream of vertically ascending cooling air is set in motion by a fan 4a arranged under the air condenser. The latent heat of condensation released during the condensation of the steam in the air condenser 4 is dissipated and lost in the atmosphere in the form of hot air.

The hydrocondenser 5 includes a secondary cooling circuit 5a using liquid water. The cooling circuit 5a makes it possible to recover the latent heat released during the condensation of the steam. The reheated water of the secondary circuit 5a is directed toward equipment or an installation B in order to give up its heat therein for external applications such as, in particular, the heating of premises or of market gardening or horticultural greenhouses or any other thermal uses. The cooled water leaving the installation B returns to the inlet of the hydrocondenser 5.

At the outlet of the condensers 4 and 5, the condensed-water circuit is looped toward the boiler 1 via pumps P and tanks.

In order to maintain the desired steam pressure at the outlet 2s of the turbine 2, a system (not represented) for modulating the flow rate of air from the cells of the air condenser 4 or the water flow rate in the hydrocondenser 5 is provided and controlled automatically.

The temperature level of the secondary circuit 5a of the hydrocondenser 5 is directly subjected to the steam pressure at the outlet of the turbine 2.

In certain particular conditions (for example: intense cold period) the pressure level of the steam at the outlet of the turbine may be increased to slightly raise the temperature of the secondary circuit. In this case, the production of electricity will also be slightly reduced. The air condenser 4 is engineered to ensure total condensation of the steam obtained from the turbine 2 or desuperheated expansion, in particular even if the auxiliary hydrocondenser is not operating.

A number of arrangements are possible for the condensers.

Figure 2:
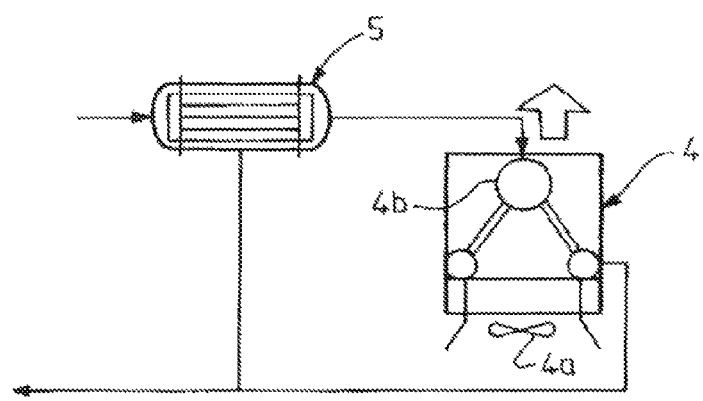
FIG. 2 is a detail of FIG. 1 representing another method of series installation of the condensers.

A series connection is illustrated in FIG. 2. The hydrocondenser 5, intended for the recovery of heat, is situated upstream of the air condenser 4 handling the maintenance of the relative vacuum at the outlet of the turbine. The steam pressure in the hydrocondenser 5 is then slightly higher than that in the condenser 4. This arrangement is advantageous when the quantity of heat taken is constant, in which case the secondary condenser may be reduced in thermal capacity.

It is also possible to provide a parallel connection as in the example illustrated in FIG. 1 where the condensers 4, 5 are positioned on separate circuits derived from the exhaust duct of the turbine 2. The hydrocondenser 5 operates with the same pressure and temperature conditions as the air condenser 4.

Figure 3:
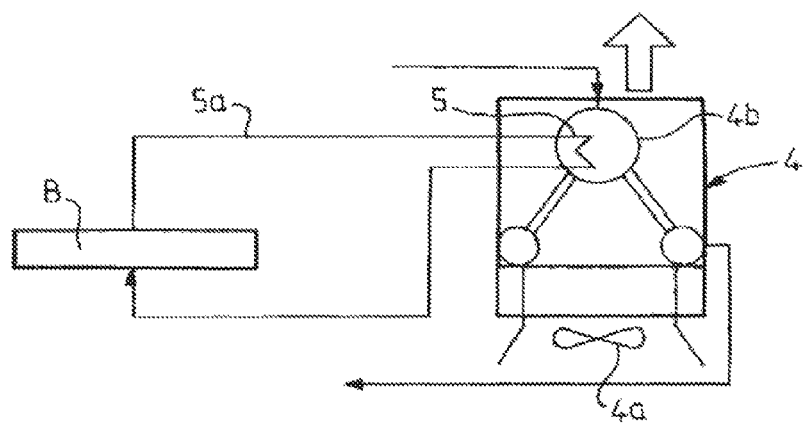
FIG. 3 is a diagram similar to FIG. 2 representing a hydrocondenser directly incorporated in an air condenser.

Another advantageous embodiment, illustrated in FIG. 3, consists, according to the invention, in having the hydrocondenser 5 physically incorporated in the air condenser 4, preferably in the chamber 4b (or cylindrical jacket of horizontal axis, the diameter of which may exceed two meters) of the air condenser 4. The hydrocondenser 5 is produced in the form of a tube bundle, in which the cooling water circulates, this bundle being housed in the air condenser 4, in particular in the chamber 4b.

The examples have been given with an air condenser 4 as first condenser. It is, however, possible to use a hydrocondenser as first condenser, in which case the installation has two parallel hydrocondensers. As a variant, it is possible to provide a single hydrocondenser with a number of separate, staged sections constituting the two condensers 4 and 5.

It is also possible to provide a steam condensation device, constituting the second condenser 5, incorporated in the steam duct at the outlet of the turbine.

In operation, the device according to the invention makes it possible to recover all or part of the latent heat of condensation of the steam at the exhaust of the turbine and transfer this heat to a coolant circuit at average temperature, and to do so without taking steam from upstream of the outlet of the turbine and therefore without reducing the electricity production. The quantity of heat evacuated and lost by the coolant of the first condenser is reduced, and the overall energy efficiency is improved.

There are numerous possible uses for the heat extracted from the second condenser 5. Notable among these are the supply of a hot water circuit for residential and tertiary heating, market gardening, horticulture, pisciculture.

Industrial thermal applications can also be envisaged, such as:

a hot water circuit for drying wastewater treatment plant mud, compost, waste, wood and other substances and materials, or the creation of additional heat for the preheating of fluid, water or combustion air.

A cold production can also be envisaged, notably in summer, from refrigerating units with Li/Br absorption fed with water at an average temperature of 45° C.-80° C.

The heat recovery potential of a hydrocondenser 5 relative to the energy entering into the system is variable depending on the thermodynamic cycle efficiency of the electricity production plant.

The invention applies in particular to EfW (energy from waste) systems for producing energy from waste, the power of which is generally between 20 and 200 MW thermal. In such systems, by design, the steam exhaust temperature in a vacuum at the turbine outlet is 45° C. to 60° C. and therefore usable by fairly close heat consumers.

Moreover, an indirect advantage of the use of a hydrocondenser is the reduction of the electricity consumption of the air condensers whose electric power, for ensuring sufficient air circulation, is higher than that of the water circulation pump in the auxiliary hydrocondenser.

The energy, economic and environmental impact of the use, according to the invention, of this heat resource, which is lost by numerous electricity production units, is considerable.

The heat, which was thus lost and which can be called "fatal heat", varies within a range of 40% to 55% of the energy produced by the combustion at the input.

In the case of high-efficiency thermal power plants, of high power, the temperature level of the fatal heat dissipated in a hydrocondenser is relatively low, around 30° C. to 35° C., so that this lost heat is technically and economically more difficult to exploit for an everyday thermal use.

Given the economic impact of a lowering of the electric production which would be linked to the pressure and the temperature of the steam at the outlet of the turbine. In high-power thermal power plants, it is not possible to envisage modulating the pressure of the steam at the turbine outlet according to the needs of the potential users of heat of an infinitesimal size relative to the heat potential dissipated by the thermal power plant.

Another quasi-prohibitive reason for the difficulty in increasing the temperature of the cooling water circuit of the hydrocondensers is either a regulatory limitation on the temperature of the water in the natural environment for open loop cooling systems (river and sea), or a limitation on the water distribution temperature in atmospheric cooling towers for semi-closed loop circuits (expansion and safety problem).

The modest size of the EfWs (energy from waste) lends itself to the use of the fatal heat available to the auxiliary condenser.

I claim:

1. A device for improving the production of heat by cogeneration comprising:
    a steam boiler;
    a turbine receiving the steam from the steam boiler, the steam expanding within the turbine, the turbine producing an exhaust;
    an air condenser receiving the exhaust from the turbine and in which the exhaust condenses into water, the air condenser being configured to exchange a latent heat of condensation from the exhaust with a cooling gas flowed through the air condenser, and to dissipate the heated cooling gas into atmosphere external to the air condenser;
    at least one hydrocondenser receiving the exhaust from the turbine and in which the exhaust condenses into water; and
    a secondary cooling circuit where a coolant for the hydrocondenser is directed toward a heat exchanger in which heat from the coolant is extracted and used, then the coolant is returned to the hydrocondenser, wherein the hydrocondenser comprises a tube
    bundle incorporated in a steam distribution chamber within the air condenser, the tube bundle circulating the coolant within the steam distribution chamber, and
    wherein the condensed water from both the air condenser and the hydrocondenser is looped back to the steam boiler.

2. The device of claim 1, wherein the air condenser is further configured to exchange a total latent heat of condensation from an entirety of the exhaust received from the turbine.

3. The device of claim 1, wherein a fan is arranged under the air condenser.

4. The device of claim 1, wherein the coolant is water.

5. The device of claim 1, wherein a temperature level of the secondary circuit is directly subject to a steam pressure at an outlet of the turbine.

6. The device of claim 1, wherein the turbine is configured to have a steam exhaust temperature in a vacuum at a turbine outlet of 45° C. to 60° C.

7. The device of claim 1, wherein the heat exchanger directs heat to a market garden or horticultural green house.

* * * * *